(12) United States Patent
Bouchard et al.

(10) Patent No.: US 7,062,095 B2
(45) Date of Patent: Jun. 13, 2006

(54) ENTROPIC ENCODING METHOD AND DEVICE

(75) Inventors: David Bouchard, Rennes (FR); Diego Santa Cruz, Geneva (CH); Raphaël Grosbois, Lausanne (CH)

(73) Assignee: Canon Kabushiki Kaisha, Tokyo (JP)

( * ) Notice: Subject to any disclaimer, the term of this patent is extended or adjusted under 35 U.S.C. 154(b) by 833 days.

(21) Appl. No.: 09/796,455

(22) Filed: Mar. 2, 2001

(65) Prior Publication Data

US 2001/0046324 A1    Nov. 29, 2001

(30) Foreign Application Priority Data

Mar. 2, 2000    (FR)    ................................. 00 02700

(51) Int. Cl.
*G06K 9/36*    (2006.01)
(52) U.S. Cl. ...................................... 382/232; 382/238
(58) Field of Classification Search ................ 382/232, 382/238, 240, 242–248; 358/539, 448
See application file for complete search history.

(56) References Cited

U.S. PATENT DOCUMENTS 5,867,602 A * 2/1999 Zandi et al. ................ 382/248

FOREIGN PATENT DOCUMENTS

EP    2 303 030 A      2/1997
EP    0 914 004 A1    5/1999

OTHER PUBLICATIONS

Schwartz E.L. et al: "Implementation of Compression with Reversible Embedded Wavelets", Proceedings of the SPIE, SPIE vol. 2564, pp. 32-43, Jul. 12, 1995.
Chai B -B et al: "Highly Efficient Codec Based on Significance-Linked Connected Component Analysis of Wavelet Coefficients", Wavelet Applications OV, Orlando, FL, USA, Apr. 22-24, 1997, pp. 647-655.

* cited by examiner

*Primary Examiner*—Duy M. Dang
(74) *Attorney, Agent, or Firm*—Fitzpatrick, Cella, Harper & Scinto

(57) ABSTRACT

A method of ordering bits in an N-bit status word (s[c]) adapted to represent the state of a coefficient (c) during an entropic encoding of the coefficient in several passes is adapted to modify the value of the last bit N−1 of the status word (s[c]), representing the sign of the status word (s[c]), according to the significance of the coefficient (c). A method for the entropic encoding of a coefficient (c) in several encoding passes using this status word (s[c]) comprises a step of comparing the value of the status word (s[c]) with the value 0 in order to determine whether a first condition is satisfied and a step of applying the first encoding pass to the coefficient (c) when the first condition is satisfied.

38 Claims, 11 Drawing Sheets

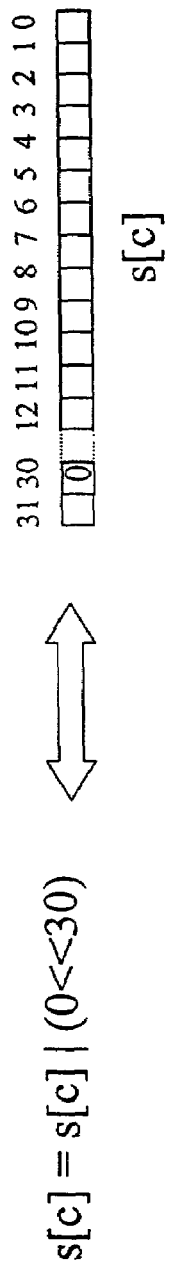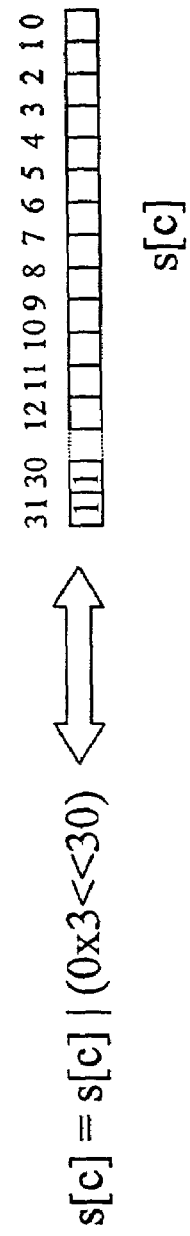
FIG. 3a
FIG. 3b s[c]=s[c] | (1<<30)

s[c]=s[c] & (~(1<<30))

s[c]=s[c] | 1<<31

ENTROPIC ENCODING METHOD AND DEVICE

The present invention concerns a method of ordering bits in a status word adapted to represent the status of a coefficient during an entropic encoding of this coefficient in several passes.

It also concerns an entropic encoding method and device using this ordering method.

The invention fits more particularly in the field of digital signal compression, used commonly for transferring or storing these signals.

The present invention applies in particular to the compression of still images and, more specifically, it is situated in the field of entropic encoding in accordance with the standard JPEG 2000.

Conventionally, during the compression of an image according to JPEG 2000, there is first of all effected, if necessary, a colour transform in order to decompose the image, for example, into one luminance component and two colour components.

This colour transform is followed by a wavelet transform which makes it possible to decompose an image into frequency sub-bands at different resolution levels.

This wavelet spectral transformation is followed by a quantisation step in which the coefficients are quantised.

The entropic encoding is next applied to all the blocks of quantised coefficients.

A first entropic encoding module allows the encoding proper of the blocks of quantised coefficients and makes it possible to generate information on the rate/distortion ratio for each block.

A second entropic encoding module makes it possible to form a bit stream from the blocks of encoded coefficients and the required rate/distortion characteristics.

In the first entropic encoding module, each quantised coefficient is encoded by bit plane, each bit plane itself being encoded in three successive encoding passes:

a significance propagation pass,
a magnitude refinement pass, and
a standardisation pass.

In each bit plane, each coefficient is visited only one time. In order to apply each encoding pass correctly, one item of status information for each coefficient is stored in a table of status words.

Each status word, with a length of N bits, is associated with a coefficient and gives some items of information concerning the coefficient currently being encoded: is the coefficient significant?, has it already been encoded during an encoding pass?, are the adjacent coefficients significant?, etc.

Thus each status word includes at least one bit indicating whether the coefficient is significant, one bit, referred to in the remainder of the description as the encoding bit, indicating whether the coefficient was encoded during a first entropic encoding pass, and bits indicating respectively that coefficients adjacent to the coefficient are significant when the value of these bits is equal to 1.

At each entropic encoding pass, when it is wished to know the value of one or other of these bits of the status word associated with the coefficient, the usual method consists of masking the status word containing the bit to be extracted, and comparing this word after masking with the value of a word in which only the bit in question is equal to 1.

The aim of the present invention is to optimise the entropic encoding of a block of coefficients using status words associated with the coefficients, by reducing in particular the number of operations necessary for accessing the value of the different bits of the status words and effecting the entropic encoding.

To this end, the present invention relates first of all to a method of ordering bits in an N-bit status word adapted to represent the status of a coefficient during an entropic encoding of said coefficient in several passes, the status word including at least one bit indicating whether the coefficient is significant, one encoding bit indicating whether the coefficient was encoded during a first entropic encoding pass and bits indicating respectively that coefficients adjacent to said coefficient are significant when the value of said bits is equal to 1.

According to the invention, the last bit N−1 of the status word is chosen to indicate whether the coefficient is significant, the value of said last bit N−1 representing the sign of the status word.

Thus the choice of the last bit N−1 of the status word for indicating whether the coefficient is significant makes it possible to access this information very quickly, simply by determining the sign of the status word.

According to a preferred characteristic of the invention, the penultimate bit N−2 of the status word is chosen as the encoding bit.

This encoding bit, used frequently during different passes in the entropic encoding of the coefficient, is thus placed in the penultimate position in the status word, so that its value can be accessed quickly simply by comparing the value of the status word with a threshold value.

According to another preferred characteristic of the invention, the indication supplied by the value of the encoding bit depends on the value of the last bit N−1 of the status word.

Correlating the values of the encoding bit and of the last bit N−1 makes it possible to delimit the value of the status word of the coefficient by a single value instead of two, which results in a reduction of the number of tests to be carried out in order to know the values of the encoding bit and of the last bit N−1.

According to one advantageous characteristic of the invention, the status word indicates that the coefficient was encoded during a first entropic encoding pass when the value of the encoding bit is equal to the value of the last bit N−1.

When successive encoding passes are applied to a coefficient, the conditions to be complied with in order to be able to make these encoding passes generally include the fact that the coefficient has not already been encoded during a first entropic encoding pass.

This condition then implies that, in the status word associated with the coefficient, the value of the encoding bit and the value of the last bit N−1 are alternated.

In practice, the value of the last bit N−1 equal to zero indicates that the coefficient is not significant and the value of the last bit N−1 equal to 1 indicates that the coefficient is significant.

Before the start of the entropic coding of the coefficients, the status words of each coefficient are easily initialised by setting all the bits of the status words to zero.

According to another aspect, the invention also concerns a method of entropic encoding of a coefficient in several passes, using an N-bit status word adapted to represent the status of the coefficient during the entropic encoding, the status word including at least one bit indicating whether the coefficient is significant, one encoding bit indicating whether the coefficient was encoded during a first entropic encoding pass and bits indicating respectively that coefficients adjacent to said coefficient are significant when the value of the bits is equal to 1.

According to the invention, the last bit N−1 of the status word is chosen in order to indicate whether the coefficient is significant, the value of said last bit N−1 representing the sign of the status word.

This entropic encoding method, thus using the ordering method in accordance with the first aspect of the invention, can be implemented in an optimum fashion.

The bit indicating whether the coefficient is significant or not being placed at the last position of the status word, it is easy to access its value by the sign of the status word.

According to a preferred characteristic of the invention, a coefficient being encoded in a first encoding pass if a first condition is satisfied, the first condition being that the coefficient is not significant and that at least one of the coefficients adjacent to the coefficient is significant, the encoding method comprises the following steps:

comparing the value of the status word associated with said coefficient with the value zero in order to determine whether or not the first condition is satisfied; and applying the first encoding pass to the coefficient when the first condition is satisfied.

Thus, by virtue of the optimum ordering of the bits in the status word, the first condition of the entropic encoding can be verified simply by comparing the value of the status word associated with the coefficient with the value zero.

According to one advantageous characteristic of the invention, the encoding method also comprises a step of updating the value of the last bit N−1 of the status word indicating whether the coefficient was found to be significant during the first entropic encoding pass.

The status word associated with a coefficient is thus updated in order to preserve the coefficient entropic encoding information.

According to another preferred characteristic of the invention, the encoding method comprises a step of updating the value of the encoding bit of the status word indicating whether the coefficient was encoded during a first entropic encoding pass.

This step of updating the encoding bit makes it possible to preserve in the status word associated with the coefficient the information relating to its encoding which will be used in subsequent entropic encoding passes.

According to a characteristic of the invention which is particularly practical, and simple to implement, the value of the last bit N−1 equal to zero indicates that the coefficient is not significant and the value of the last bit N−1 equal to 1 indicates that the coefficient is significant, and at the comparison step the first condition is satisfied if the value of the status word is strictly greater than zero.

According to one advantageous characteristic of the invention, the encoding method also comprises a step of updating the bit values of the status words associated with coefficients adjacent to said coefficient, when the coefficient was found to be significant during the first entropic encoding pass.

This updating step makes it possible to modify the status words of the adjacent coefficients in order to optimise their encoding.

According to another advantageous characteristic of the invention, the encoding method comprises a step of updating the bit values of the status words associated with coefficients adjacent to said coefficient when the coefficient was found to be significant and negative during the first entropic encoding pass.

As before, information useful to the subsequent encoding of the adjacent coefficients are stored in the status words associated with the adjacent coefficients.

According to another preferred characteristic of the invention, a coefficient being encoded in a second encoding pass if a second condition is satisfied, the second condition being that the coefficient is significant and that it was not encoded during a first encoding pass, the encoding method comprises the following steps:

comparing the value of the status word associated with said coefficient with a threshold value in order to determine whether the second condition is satisfied or not; and applying the second encoding pass to the coefficient when the second condition is satisfied.

A simple comparison of the value of the status word with a threshold value makes it possible to know in fact the value of the last bit N−1 and of the encoding bit of the status word and to apply the second encoding pass correctly.

In a particularly practical manner, the value of the last bit N−1 equal to zero indicates that the coefficient is not significant and the value of the last bit N−1 equal to 1 indicates that the coefficient is significant, the status word indicates that the coefficient was encoded during a first encoding pass when the value of the penultimate bit N−2 is equal to the value of the last bit N−1 and, at the comparison step, the second condition is satisfied if the value of the status word is less than or equal to $-2^{N-2}$.

In a similar manner, according to another preferred characteristic of the invention, a coefficient being encoded in a third encoding pass if a third condition is satisfied, the third condition being that the coefficient is not significant and that it was not encoded during a first encoding pass, the encoding method comprises the following steps:

comparing the value of the status word associated with said coefficient with a threshold value in order to determine whether the third condition is satisfied or not; and applying the third encoding pass to the coefficient when the third condition is satisfied.

As before, in a particularly practical manner, the value of the last bit N−1 equal to zero indicates that the coefficient is not significant and the value of the last bit N−1 equal to 1 indicates that the coefficient is significant, the status word indicates that the coefficient was encoded during a first encoding pass when the value of the penultimate bit N−2 is equal to the value of the last bit N−1 and, at the comparison step, the second condition is satisfied if the value of the status word is greater than or equal to $2^{N-2}$.

As before, the third entropic encoding pass can be implemented easily after a simple comparison of the value of the status word associated with the coefficient with a threshold value.

According to another preferred characteristic of the invention, the entropic encoding in several passes being applied successively to different bit planes of a coefficient, the encoding method comprises:

a step of reinitialising the status word associated with said coefficient after the encoding of a bit plane of said coefficient, in which only the value of the encoding bit is reinitialised.

In a practical manner, in order to obtain alternating values of the encoding bit and last bit N−1 of the status word when the coefficient has not already been encoded during a first encoding pass, at the reinitialisation step, the value of the last bit N−1 of the status word is read and an inverse value is written in the encoding bit of the status word.

According to another aspect of the invention, it also concerns a device for the entropic encoding of a coefficient in several passes, using an N-bit status word adapted to represent the status of the coefficient during the entropic encoding, the status word including at least one bit indicating whether the coefficient is significant, one encoding bit indicating whether the coefficient was encoded during a first entropic encoding pass and bits indicating respectively that coefficients adjacent to said coefficient are significant when the value of said bits is equal to 1, a coefficient being encoded in a first encoding pass if a first condition is satisfied, the first condition being that the coefficient is not significant and that at least one of the coefficients adjacent to said coefficient is significant.

According to the invention, the value of the bit N−1 of the status word, representing the sign of the status word, indicates whether the coefficient is significant, and the entropic encoding device comprises means of comparing the value of the status word associated with said coefficient with the value zero in order to determine whether the first condition is satisfied or not; and application means adapted to apply a first encoding pass to the coefficient when the first condition is satisfied.

The present invention also concerns a digital signal processing device, a digital photographic apparatus, a digital printer, a digital camera, a photocopier and a computer adapted to implement the ordering method and/or the entropic encoding method according to the present invention.

The characteristics and advantages of this encoding device, this digital signal processing device, this digital photographic apparatus, this digital printer, this digital camera, this photocopier and this computer are similar to those described previously for the ordering and entropic encoding methods according to the invention.

The invention also relates to a computer program containing sequences of instructions or portions of software codes adapted to implement an ordering method and/or an entropic encoding method according to the invention.

The invention also concerns an information carrier of the diskette or compact disc (CD) type storing such a computer program.

Other particularities and advantages of the invention will also appear in the following description.

In the accompanying drawings, given by way of non-limitative examples:

FIGS. 3a and 3b illustrate the updating of the status word associated with the coefficient after a significance propagation pass:

Figure 1:
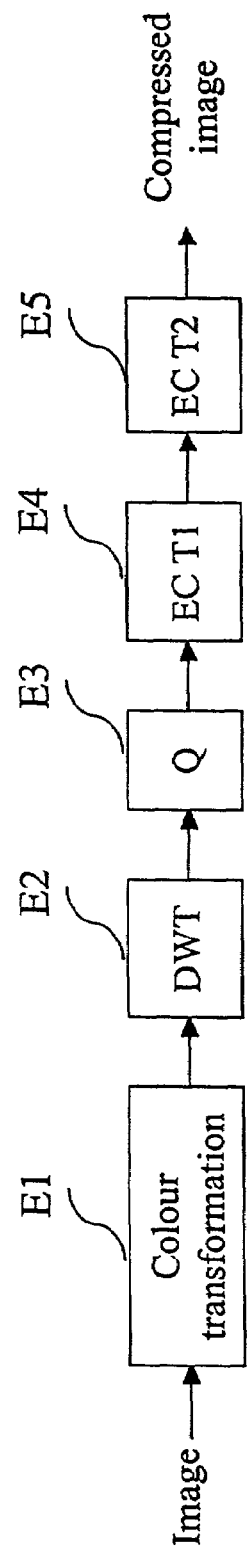
FIG. 1 illustrates a encoding chain in accordance with the standard JPEG 2000.

A description will first of all be given, with reference to FIG. 1, of an entropic encoding chain in accordance with JPEG 2000, applied to a digital image.

Naturally, the present invention can be applied to the encoding of any digital signal, with one or more dimensions.

In this particular embodiment, the digital signal is of dimension 2, formed by a series of digital samples representing an image. The digital samples are for example bytes, each byte value representing a pixel of an image.

A colour transformation step E1 is possibly effected first of all on the image in order to separate the luminance components from the colour components.

A spectral transformation step E2 is then applied to all the coefficients.

In this example, a discrete wavelet transformation (DWT) decomposes the digital signal into frequency sub-bands.

This decomposition of an image into sub-bands is well known, and the different analysis steps used are stated below briefly, with reference to FIG. 2.

A first analysis unit receives the image signal and filters it through two digital filters, respectively low pass and high pass, in a first direction, for example horizontal.

After passing through decimators by two, the resulting filtered signals are in their turn filtered by two filters, respectively low pass and high pass, in a second direction, for example vertical.

Each signal is once again passed through a decimator by two. There are then obtained, at the output of this first analysis unit, four sub-bands $LL_1$, $LH_1$, $HL_1$ and $HH_1$ with the highest resolution in the decomposition.

The sub-band $LL_1$ includes the components of low frequency in both directions of the image signal. The sub-band $LH_1$ includes the components of low frequency in a first direction and high frequency in a second direction of the image signal I. The sub-band $HL_1$ includes the components of high frequency in the first direction and the components of low frequency in the second direction. Finally, the sub-band $HH_1$ includes the components of high frequency in both directions.

A second analysis unit in its turn filters the sub-band $LL_1$ in order to supply in the same way four sub-bands $LL_2$, $LH_2$, $HL_2$, $HH_2$.

In this way seven sub-bands and two resolution levels are obtained. Naturally, the number of resolution levels, and consequently of sub-bands, can be chosen differently, and can for example be equal to three resolution levels with ten sub-bands.

The sub-bands HL, LH and HH could also be decomposed into sub-bands with a lower resolution.

After the application of this spectral transformation, the coefficients are quantised in a quantisation step E3.

An entropic encoding is next applied to these quantised coefficients in order to obtain the compressed image.

This entropic encoding is broken down into two successive steps:

the first entropic encoding step E4 entropically codes the quantised coefficients of the sub-band and constructs a bit stream associated with each block of coefficients.

During this first entropic encoding step E4, rate/distortion characteristics are also generated.

the second entropic encoding step E5 groups together all the bit streams obtained for each block of coefficients and generates the compressed image from these bit streams and rate/distortion characteristics.

During the first entropic encoding step E4, each quantised coefficient is encoded successively by bit plane, each bit plane itself being encoded in three successive passes:

a significance propagation pass,
a magnitude refinement pass, and
a standardisation pass.

In order to correctly apply the different passes of the entropic encoding, it is necessary to store, for each coefficient of a block, an item of status information on this coefficient.

To this end, and in accordance with the invention a status word is associated with each coefficient, in order to store this status information.

This status word has a length of N bits, each bit making it possible to store an item of information as a function of its value.

In this example, and non-limitatively, the status words associated with each of the coefficients have a length of 32 bits.

Naturally, status words with a lesser length, equal for example to 16 bits, or of a greater length, could also be used.

Thus a status word s[c] is associated with each coefficient c of a block of coefficients.

All these status words s[c] are stored in a table of status words.

Figure 2:
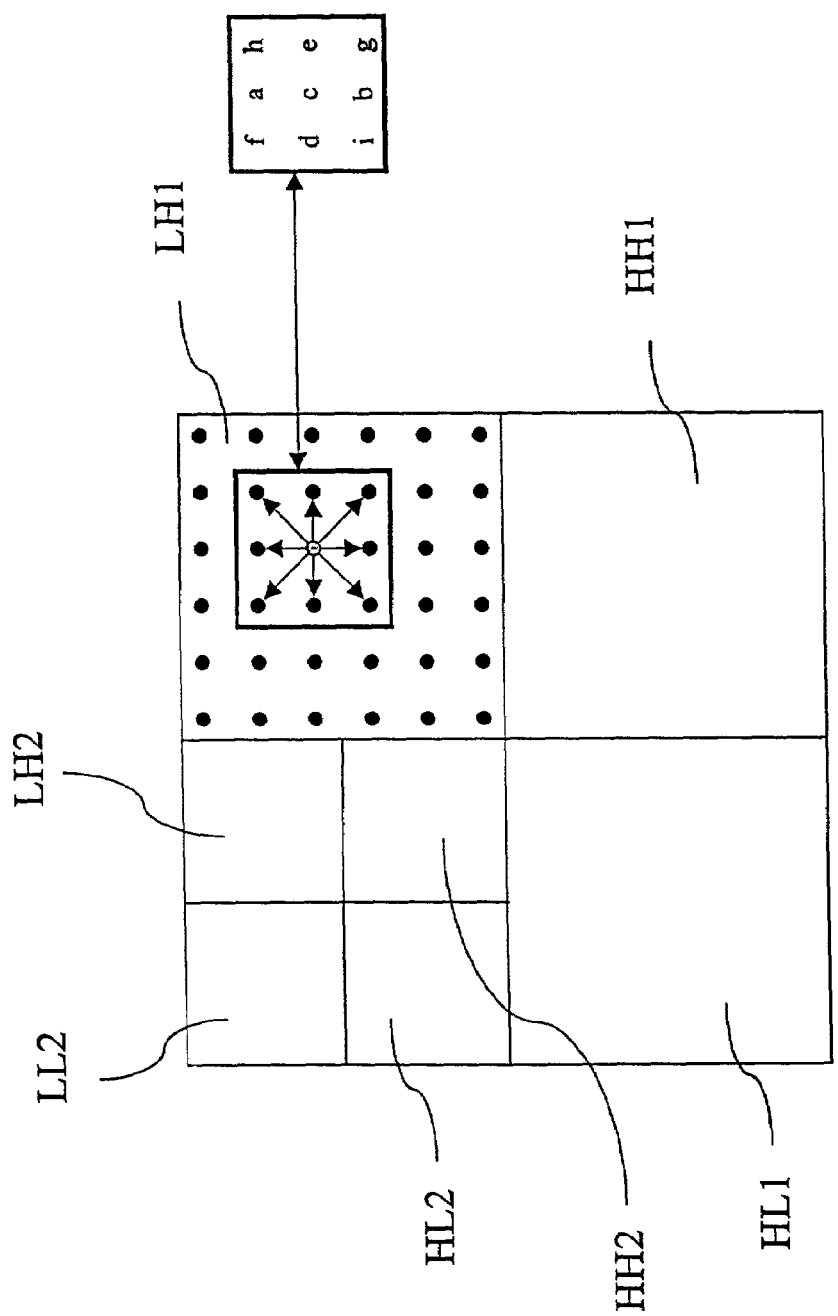
FIG. 2 depicts schematically a block of coefficients to be encoded after spectral decomposition of a digital image.

There will be described hereinafter the ordering of the bits of a status word s[c] associated with a coefficient c belonging to a block of coefficients corresponding to the sub-band $LH_1$ resulting from the spectral decomposition as illustrated in FIG. 2.

Naturally, the entropic encoding method described below applies to any sub-bands of spectral coefficients.

Here, the coefficient in question c has eight adjacent coefficients in the block of coefficients referred to a, b, d, e, f, g, h and i.

According to the invention, the bits of the status word s[c] are ordered in the following manner with reference to FIG. 2 illustrating a block bit 31, that is to say the last bit N−1 of the status word s[c], indicates whether the coefficient has been found significant.

In a usual manner in this binary notation, the last bit of the status word, that is to say here bit 31, represents the sign of this status word.

In this example embodiment, and non-limitatively, the value of the last bit 31 equal to 0 indicates that the coefficient c is not significant, and the value of this last bit 31 equal to 1 indicates that the coefficient c is significant.

bit 30, that is to say the penultimate bit N−2 of the status word s[c], indicates whether the coefficient has already been encoded in a first encoding pass for the current bit plane, that is to say here in a significance propagation pass.

This bit 30, hereinafter referred to as the encoding bit, makes it possible, for each bit plane, to store information on the encoding of the coefficient in the first significant propagation pass.

The indication supplied by the value of this encoding bit 30 depends on the value of the last bit 31 of the status word s[c].

Preferably, in order to facilitate access to the value of the status word, this status word s[c] indicates that the coefficient c was encoded during a first entropic encoding pass when the value of the encoding bit 30 is equal to the value of the last bit 31.

Conversely, the status word s[c] indicates that the coefficient c was not encoded during the first entropic encoding pass when the values of the encoding bit 30 and of the last bit 31 are alternating.

Thus, in this example, if bit 31 is equal to zero then a value of zero for the encoding bit 30 indicates that the coefficient was encoded during the significance propagation pass. A value of 1 for this encoding bit 30 indicates that it was not encoded.

Conversely, if bit 31 is equal to 1, then a value of zero for the encoding bit 30 indicates that the coefficient was not encoded during the significance propagation pass. A value of 1 for the encoding bit 30 indicates conversely that it was encoded.

Bits 13 to 29 of this status word are not used and have a value of zero.

bit 12 indicates whether the coefficient d, situated immediately to the left of the coefficient in question c, is significant and negative, bit 11 indicates whether the coefficient e, situated immediately to the right of the coefficient in question c, is significant and negative, bit 10 indicates whether the coefficient a, situated immediately above the coefficient in question c, is significant and negative, bit 9 indicates whether the coefficient b, situated immediately below the coefficient in question c, is significant and negative, bit 8 indicates whether the coefficient in question c was encoded by the magnitude refinement pass in a previous bit plane.

This bit 8 is not used in the tests carried out during the different encoding passes in order to know whether or not the coefficient is to be encoded. On the other hand, it is used during the magnitude refinement pass, in the encoding primitive itself.

bit 7 indicates whether the coefficient d, situated immediately to the left of the coefficient in question c, is significant, bit 6 indicates whether the coefficient e, situated immediately to the right of the coefficient in question c, is significant, bit 5 indicates whether the coefficient a, situated immediately above the coefficient in question c, is significant, bit 4 indicates whether the coefficient b, situated immediately below the coefficient in question c, is significant, bit 3 indicates whether the coefficient f, situated above and to the left of the coefficient in question c, is significant, bit 2 indicates whether the coefficient h, situated above and to the right of the coefficient in question c, is significant, bit 1 indicates whether the coefficient i, situated below and to the left of the coefficient in question c, is significant, and bit 0 indicates whether the coefficient g, situated below and to the right of the coefficient in question c, is significant.

This status word s[c] is used during the entropic encoding of a coefficient c and makes it possible to know whether the coefficient is significant, whether it has already been encoded, whether its direct adjacent coefficients are significant, or significant and negative, etc.

Figure 3:
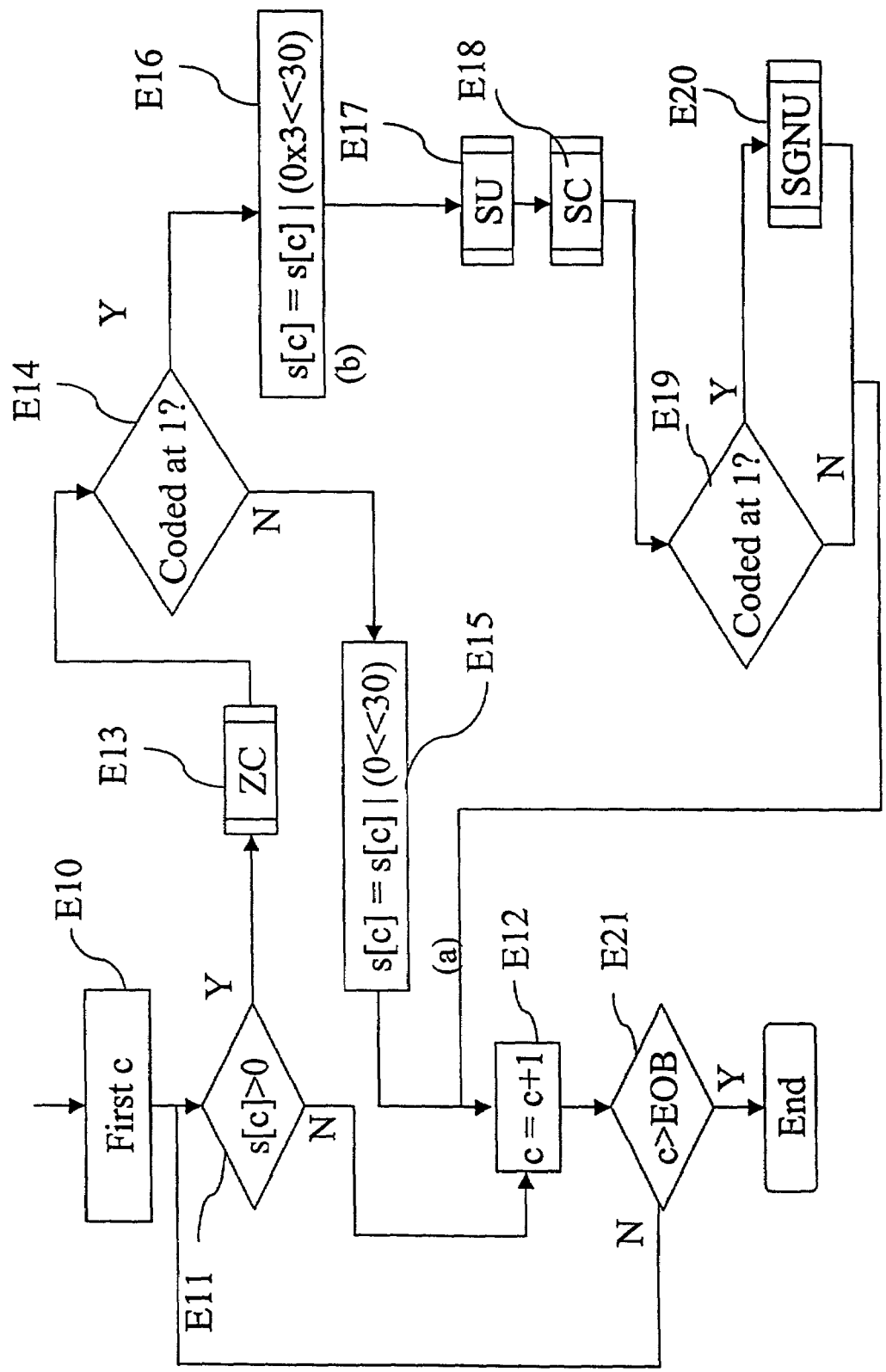
FIG. 3 is an algorithm representing a significance propagation pass during the encoding of a block of coefficients.

A description will first of all be given, with reference to FIG. 3, of a first entropic encoding pass, corresponding here to a significance propagation pass in JPEG 2000.

A coefficient is encoded in this first encoding pass if a first condition is satisfied.

For this first significance propagation pass, a coefficient c is encoded if it is not significant and at least one of the adjacent coefficients is significant.

This first condition is represented, in the status word s[c] associated with the coefficient C, by the fact that the last bit 31 of this status word s[c] is equal to zero, and that at least one of the bits 0, 1, 2, 3, 4, 5, 6, 7 is equal to 1.

However, in the present case, bit 30 and bit 8 of the status word s[c] cannot have a value other than zero, since the significance propagation pass and the magnitude refinement pass have not yet been carried out.

In addition, bits 13 to 29 are not used and therefore have a value of zero.

Finally, bits 9 to 12 are a "specialisation" of bits 4 to 7, that is to say, for example, if one of bits 9 to 12 is equal to 1, then the corresponding bit 4 to 7 will also be.

Since the last bit 31 of the status word s[c] corresponds to the sign bit of the word, its value can be extracted by making a simple comparison of the status word with the value zero.

In addition, if at least one of bits 0 to 7 is non-zero, the absolute value of the status word s[c] will be strictly greater than zero.

Consequently, in order to determine whether the first condition is satisfied, it suffices to test whether the status word s[c] is strictly greater than zero.

The significance propagation pass includes first of all a first initialisation step E10 in which the first coefficient c of the block of coefficients to be encoded is considered.

The encoding method then includes a step E11 of comparing the value of the status word s[c] with the value zero. If the value of the status word s[c] is not strictly positive, the following coefficient is considered in a step E12.

Otherwise, the status word being strictly greater than zero, a first encoding pass is applied to the coefficient since the first condition is satisfied.

In this significance propagation pass, a ZC (Zero-Coding) primitive is used. This primitive is described in JPEG 2000 Verification Model Text Reference. It consists of encoding the coefficient in question c by means of a context which will be obtained as a function of the significance of its adjacent coefficients.

This ZC primitive is well known and will not be explained in detail below.

Whatever the result of this ZC primitive at the end of the encoding step E13, the coefficient c is considered as having been encoded in the significance propagation pass and the encoding bit 30 of its status word s[c] must therefore be updated.

The updating of this encoding bit 30 depends on the value of the last bit 31 of the status word s[c].

It is checked in a test step E14 whether the coefficient c, at the end of the encoding step E13, has been encoded at 1.

In the negative, this means that the coefficient c has not been found significant.

The value of the last bit 31 of the status word s[c] therefore does not change and remains equal to 0.

In an updating step E15, the value of the encoding bit 30 is simply set to 0.

This updating of the value of the encoding bit 30 is illustrated in FIG. 3a, in which it can be seen that the value of the encoding bit 30 of the status word s[c] is set to 0, the other values of the bits of the status word s[c] remaining unchanged.

If, at the end of the test step E14, the coefficient has been encoded at 1, it is deduced therefrom that the coefficient c has been found significant.

In this case, the last bit 31 of its status word s[c] must take the value 1.

The coefficient c also having been encoded during this significance propagation pass, the value of the encoding bit 30 of the status word s[c] must be equalised with the value of the last bit 31, that is to say set to 1.

This updating step E16 is illustrated in FIG. 3b, in which it can be seen that the value of the last bit 31 and of the encoding bit 30 are set to 1.

If, at the end of the test E14, the ZC primitive returns the value 1, the coefficient c being significant, the values of the bits of the status words of its adjacent coefficients must also be updated by an SU (Significance Update) primitive.

The updating of the values of the status words in accordance with the SU primitive will be described subsequently with reference to FIG. 4.

Next, the first significance propagation pass includes a second SC (Sign Coding) primitive used in a encoding step E18 and which makes it possible to code the sign of the coefficient c as a function of the immediately adjacent coefficients (vertical and horizontal) when this coefficient c has been found significant.

The result of this SC primitive is considered in a test step E19. If the result of this encoding operation E18 is equal to 1, this means that the coefficient has been found negative and an SGNU (Sign Update) primitive is used in a step E20 in order to update the status words of the vertical and horizontal adjacent coefficients.

This updating step E20 will be described subsequently with reference to FIG. 5.

After having processed the coefficient c, the following coefficient is passed to in a step E12 (c=c+1).

It is checked in a test step E21 whether the end of the block EOB of coefficients to be encoded has been reached, and in the negative, the steps E11 to E21 are reiterated for the following coefficient c+1 of the block to be encoded.

Figure 4:
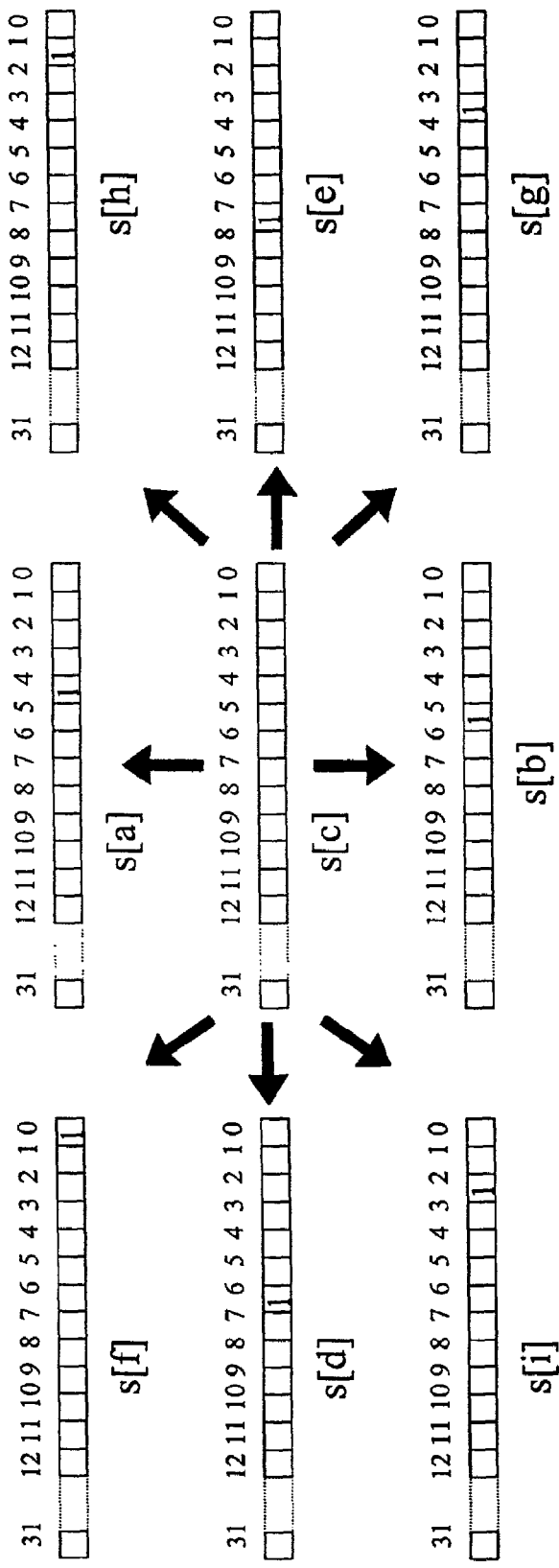
FIGS. 4 and 5 illustrate the updating of the status words of coefficients adjacent to a coefficient after the significance propagation pass.

With reference to FIG. 4, the SU (Significance Update) primitive is adapted to update the significance of the coefficient c in the status words associated with its adjacent coefficients.

This is because, when a coefficient is found significant, the status words of the adjacent coefficients in the block must be updated in order to reflect this new status. In the example illustrated here, in which the coefficient in question c has eight adjacent coefficients in the block of coefficients in question, for each of these adjacent coefficients the bit in question amongst the first eight bits, from 0 to 7, of their status words is updated.

Thus, for example, bit 0 of the status word s[f], of the adjacent coefficient f situated above and to the left of the coefficient c currently being encoded will be set to 1, bit 1 of the status word s[h] of the adjacent coefficient h situated above and to the right of the coefficient c currently being encoded will be set to 1, and so on for each of the other adjacent coefficients a, b, d, e, g and of the coefficient c.

Figure 5:
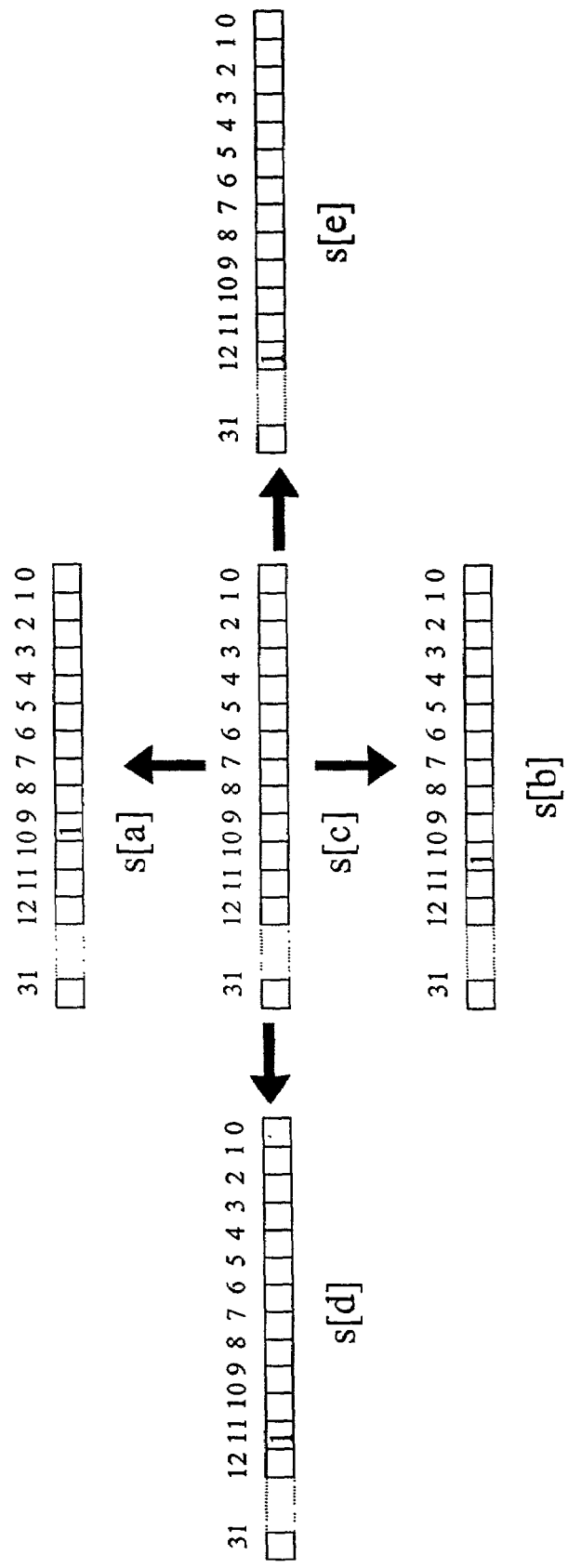

Likewise, as illustrated in FIG. 5, at the end of the coefficient Sign Coding primitive, it is also necessary to update the sign of this coefficient c in the status words of the adjacent coefficients.

The bits of the status words indicating the sign of the adjacent coefficients correspond in each status word to bits 9, 10, 11 and 12.

More precisely, bit 9 of the status word s[a] of the adjacent coefficient a, situated above the coefficient c currently being encoded, is set to 1.

Likewise, bit 10 of the status word s[b] of the adjacent coefficient b, situated below the coefficient c currently being encoded, will be set to 1.

In a similar manner, bit 11 of the status word s[d] of the coefficient d, situated immediately to the left of the coefficient c currently being encoded, is also set to 1, and bit 12 of the status word s[e] of the adjacent coefficient e, situated immediately to the right of the coefficient c currently being encoded, is also set to 1.

When the first entropic encoding pass has been carried out, and the updates which also follow on from this, the encoding method includes a second encoding pass in which the coefficient is encoded if a second condition is satisfied.

In the entropic encoding according to JPEG 2000, the second encoding pass is a magnitude refinement pass, which is applied to the coefficient when the latter is significant and has not been encoded during the first encoding pass, that is to say the significance propagation pass.

This second condition is fulfilled when the status word s[c] associated with the coefficient c to be encoded has a value of the last bit 31 equal to 1 and a value of the encoding bit 30 equal to 0.

Consequently, since the last bit 31 is equal to 1, the value of the status word s[c] must be negative. In addition, the penultimate bit 30 must be equal to 0, bits 13 to 29 are always equal to 0 and bits 0 to 12 can take any value.

The possible values of the status word s[c] for the coefficient c to be encoded are therefore always less than $-2^{N-2}$, where N is the length of the status word, here equal to 32.

Figure 6:
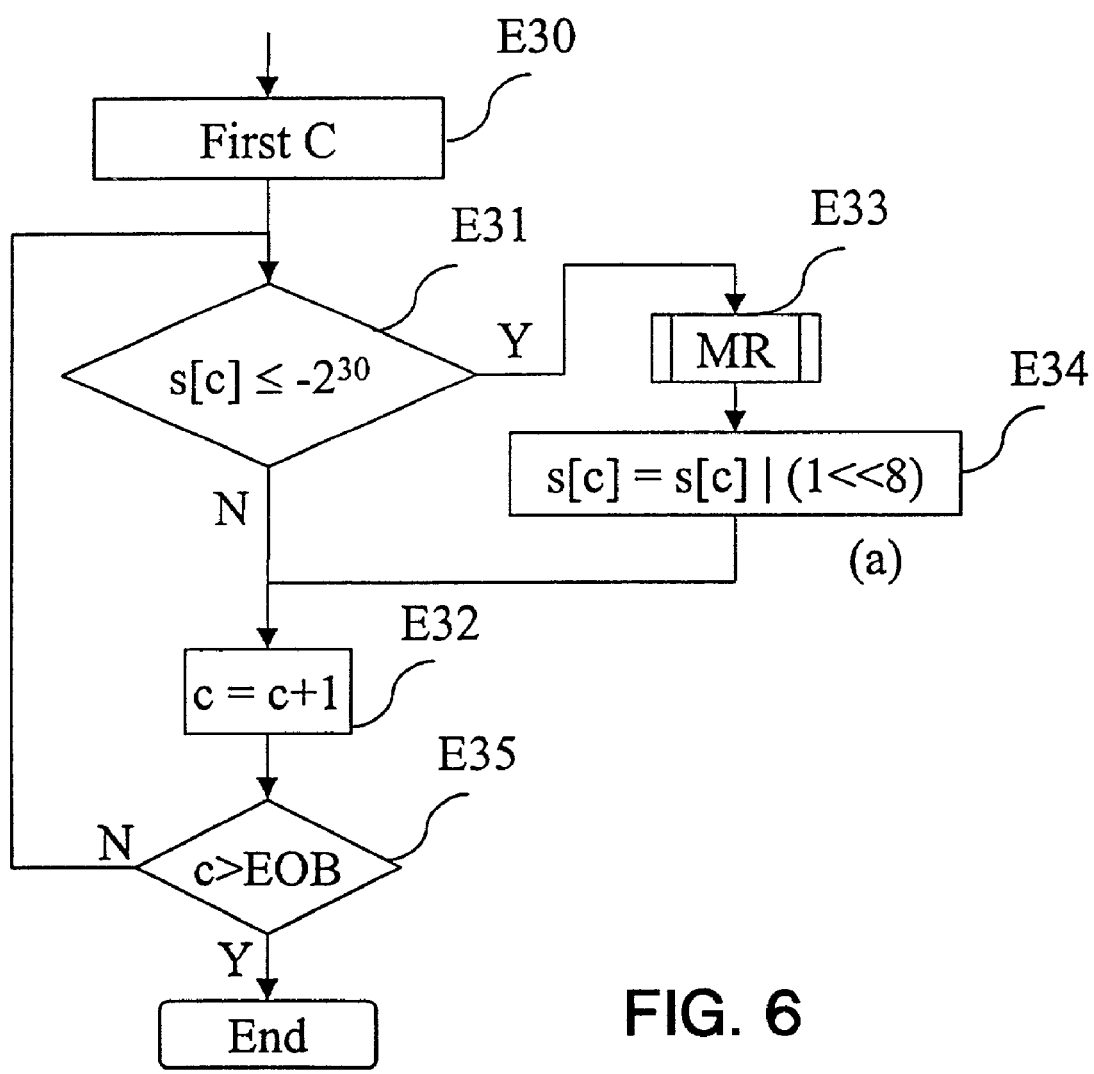
FIG. 6 is an algorithm representing a magnitude refinement pass applied during the encoding of a block of coefficients.

With reference to FIG. 6, during the magnitude refinement pass, and after a step E30 of initialising this encoding pass by considering the first coefficient c, a comparison step E31 consists of comparing the value of the status word s[c] of the coefficient c with a threshold value here equal to $-2^{30}$.

This simple comparison makes it possible to determine whether the second condition is satisfied in order to apply or not the magnitude refinement pass to the coefficient c.

It should be noted that, by virtue of the invention, and the ordering of the bits in the status word s[c], a single comparison operation makes it possible to access the value of both the bits 31 and 30. This comparison is faster than the usual methods used consisting of isolating bits 31 and 30 together and comparing them with a known value, which require two operations instead of only one.

At the end of the comparison step E31, if the value of the status word s[c] is greater than the threshold value $-2^{30}$, the following coefficient is passed to in a step E32.

On the other hand, if the value of the status word s[c] is less than or equal to the threshold value $-2^{30}$, it is deduced therefrom that the condition for applying the second entropic encoding pass is satisfied and a encoding step proper E33 is implemented.

This encoding step E33 consists of applying the MR (Magnitude Refinement) primitive which is described in the standard JPEG 2000 Verification Model Text Reference and will not be explained in the remainder of the description. It makes it possible to refine the value of the coefficient c as a function of the significance of its immediately adjacent coefficients (vertical and horizontal), that is to say here coefficients a, b, d, e.

At the end of this magnitude refinement pass E33, an updating step E34 is implemented in order to update the status word s[c].

Figure 6A:
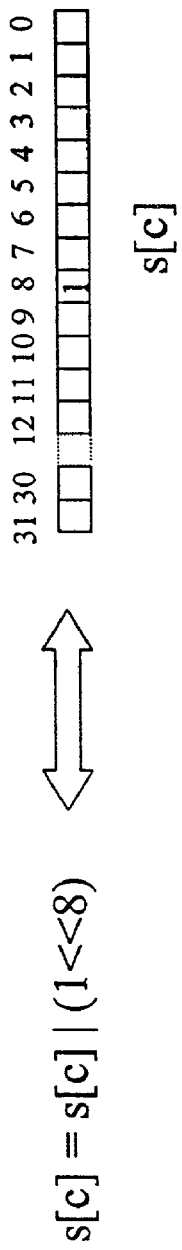
FIG. 6a illustrates the updating of the status word associated with the coefficient after the magnitude refinement pass.

This updating step E34 is illustrated in FIG. 6a.

It consists of modifying the value of bit 8 of the status word s[c] by allocating to it a value of 1 signifying that the magnitude refinement pass has already been applied to the coefficient c in a previous bit plane.

The following coefficient c=c+1 is next considered in a step E32 and in a test step E35 it is checked whether the end of the block of coefficients to be encoded has been reached.

Steps E31 to E35 are reiterated until the end of the block is reached.

The entropic encoding method according to JPEG 2000 next includes a third entropic encoding pass, referred to as a standardisation pass, which is implemented if a third condition is satisfied.

This third condition is fulfilled when the coefficient c to be encoded is not significant and the coefficient has not already been encoded during a first encoding pass, that is to say during the significance propagation pass.

This third condition is expressed in the status word s[c] associated with the coefficient c by the fact that the last bit 31 has a value equal to 0 and the penultimate bit 30, that is to say the encoding bit, has a value equal to 1.

The last bit 31 having a value equal to 0 is equivalent to the fact that the value of the status word s[c] of the coefficient c is positive or zero. In addition, testing whether the penultimate bit 30 has a value of 1 is equivalent to testing whether the value of the status word s[c] of the coefficient c is greater than or equal to $2^{N-2}$, where N is the length of the status word s[c].

Here the threshold value is consequently $2^{30}$.

After an initialisation step E40 in which the first coefficient c of the block of coefficients to be encoded is considered, it is checked in a comparison step E41 whether the value of the status word s[c] associated with the coefficient to be encoded c is greater than or equal to this threshold value equal to $2^{30}$.

In the negative, the following coefficient is passed to directly in a step E42.

On the other hand, if the value of the status word s[c] is greater than or equal to the threshold value $2^{30}$, the third encoding pass is applied to the coefficient c.

It should be noted that here also a simple operation of comparing the value of the status word s[c] with a threshold value $2^{30}$ makes it possible to deduce the value of the two bits 30 and 31 of the status word, and thus to determine whether the third condition is satisfied.

A step E43 is implemented in order to apply the standardisation pass. This standardisation pass is described in detail in JPEG 2000 Verification Model Test Reference and does not need to be explained here. It uses the ZC (Zero-Coding) and RLC (Run-Length Coding) primitives.

At the end of this third encoding pass E43, a test step E44 determines whether the coefficient has been found significant.

In the negative, before applying the entropic encoding to a following bit plane of the coefficient, the status word s[c] associated with the coefficient c after encoding is reinitialised.

This reinitialisation step consists of reinitialising the value of the encoding bit 30 of the status word s[c] of the coefficient c. However, only this value must be reinitialised whilst the value of the last bit 31 must not change.

Since the value of the encoding bit 30 depends on that of the last bit 31, it is necessary to first of all read, in a reading step E45, the value of the last bit 31 of the status word s[c] in order to enter an opposite value in the encoding bit 30 of the status word s[c].

In practice, it is checked in a reading step E45 whether the value of the last bit 31 is equal to 1.

In the negative, the value of the encoding bit 30 is set to 1.

Figure 7:
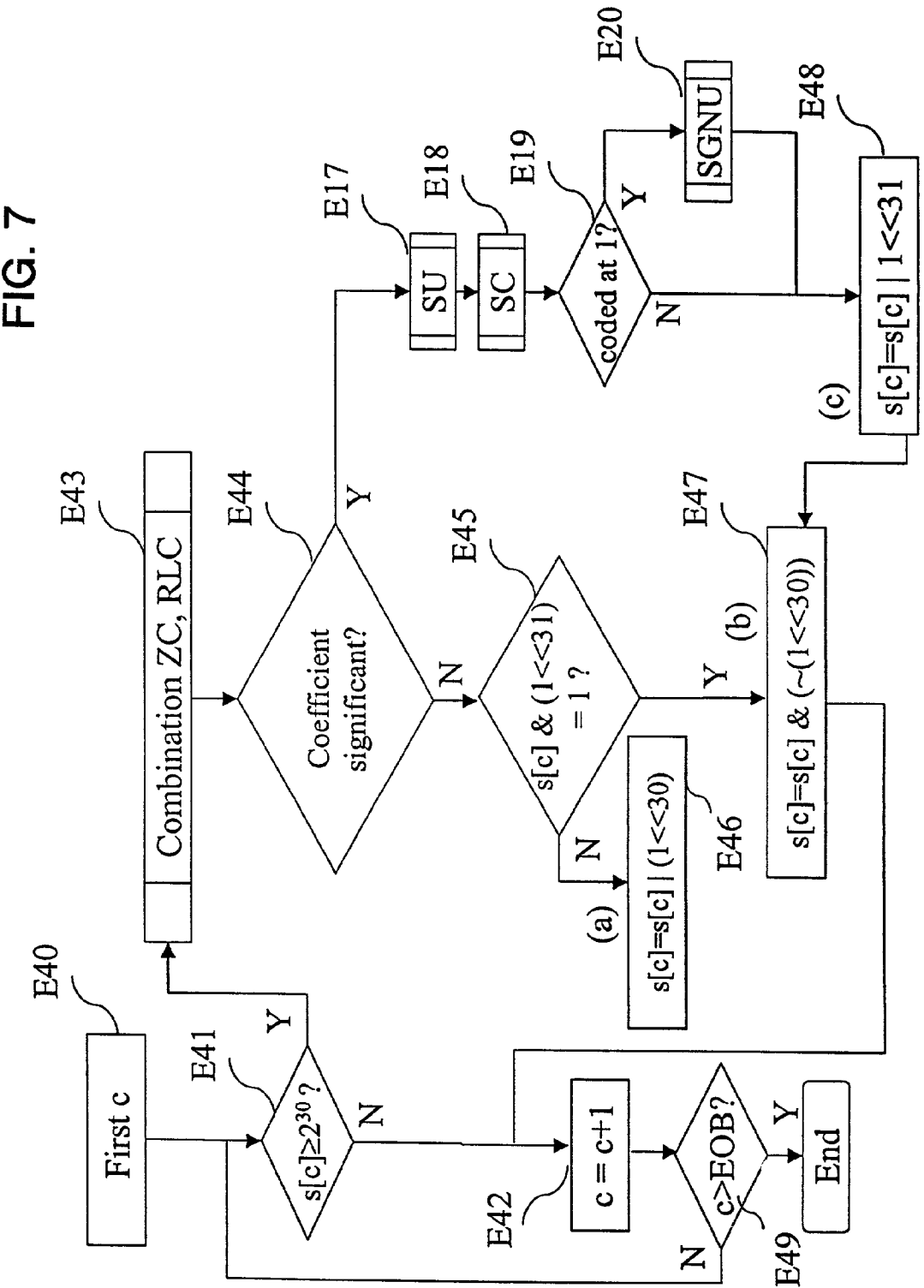
FIG. 7 is an algorithm illustrating a standardisation pass during the encoding of a block of coefficients.
Figure 7A:
FIGS. 7a, 7b and 7c illustrate the updating of the status word associated with a coefficient after the standardisation pass.

This updating of the encoding bit 30 is illustrated in FIG. 7a.

On the other hand, if the value of the bit 31 is equal to 1 at the end of the reading step E45, the value of the encoding bit 30 is then set to zero.

Figure 7B:
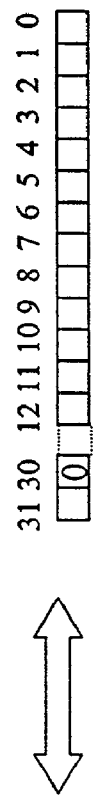

This updating is illustrated in FIG. 7b.

Moreover, if the coefficient was found significant during the test step E44, the step E17 of updating the status words of the adjacent coefficients is performed as described previously with reference to FIG. 4.

A sign encoding (SC) primitive is used in a encoding step E18 in the same way as before.

It is also checked in a test step E19 whether or not the result of this primitive is equal to 1. In the affirmative, that is to say when the coefficient c has been found negative, an updating step E20 is implemented as described previously with reference to FIG. 5.

Figure 7C:
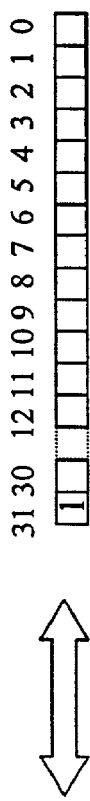

Next, whatever the sign found for the coefficient at the end of the encoding step E18, a step E48 of updating the value of bit 31 of the status word s[c] associated with the coefficient c is implemented as illustrated in FIG. 7c.

The coefficient c having been found significant at the end of test E44, the value of this bit 31 is set to 1.

Next the value of the penultimate bit 30 is reinitialised, that is to say the encoding bit in a step E47 as described previously with reference to FIG. 7b.

The value of the bit 31 being equal to 1, the value of the encoding bit 30 is set to zero so as to signify that the coefficient has not already been encoded during a first encoding pass.

The coefficient c+1 in the series of coefficients to be encoded is next considered in a step E42.

A test step E49 checks whether this following coefficient does indeed exist in the block of coefficients to be encoded and, in the affirmative, all the steps E41 to E48 are reiterated for this following coefficient until the end of the block has been reached.

All the encoding steps are next reiterated for each bit plane of the coefficients of the block.

By virtue of the invention, each encoding pass in the entropic encoding method can thus be performed using simple operations of comparing the value of the status word s[c] associated with the coefficient c to be encoded with threshold values.

Figure 8:
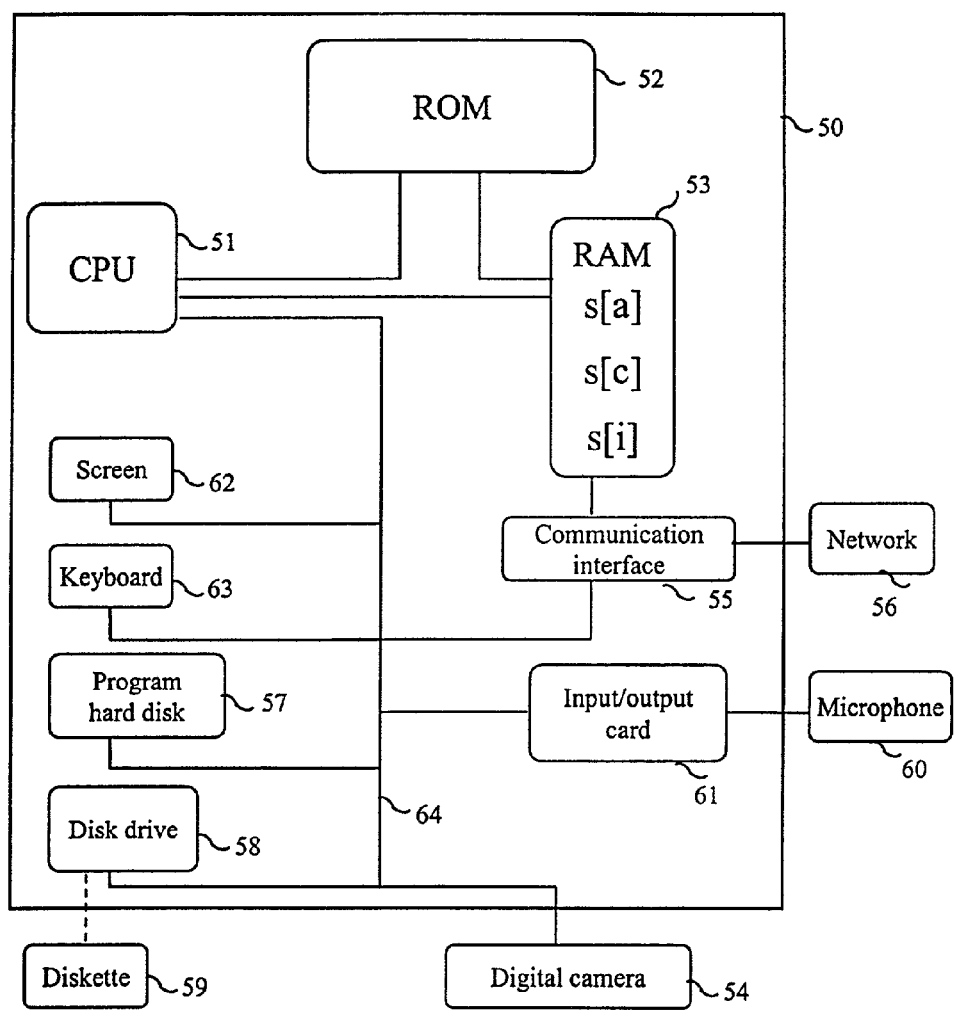
FIG. 8 illustrates a computer adapted to implement the ordering and encoding methods according to the invention.

FIG. 8 illustrates a device for the entropic encoding, in several passes, of a coefficient adapted to implement the ordering and encoding methods described previously.

In this example, the encoding device is incorporated in a computer 50.

Naturally, it could be incorporated in all types of digital signal processing devices, and notably in a digital photographic apparatus, a digital printer or a photocopier.

In order to implement the invention, this encoding device comprises:

means of comparing the value of the status word s[c] associated with the coefficient c with the value zero in order to determine whether the first encoding condition is satisfied, means of applying the first encoding pass to the coefficient c when the first condition is satisfied, means of updating the value of the last bit 31 of the status word s[c] indicating whether the coefficient was found significant during the first entropic encoding pass, means of updating the value of the encoding bit 30 of the status word s[c] indicating whether the coefficient was encoded during an first entropic encoding pass, means of updating the bit values of the status words associated with coefficients adjacent to the coefficient c when the coefficient has been found significant or when the coefficient has been found significant and negative during the first entropic encoding pass, means of comparing the value of the status word s[c] associated with the coefficient c with a threshold value, here equal to $-2^{30}$ or $2^{30}$, in order to determine respectively whether a second condition or a third condition is satisfied, means of applying a second and third encoding pass to the coefficient c respectively when the second or third condition is satisfied, and means of reinitialising the status word associated with the coefficient c after the encoding of a bit plane of said coefficient.

All these means of the encoding device are incorporated in a microprocessor 51 (CPU), a read only memory 52 containing a program for implementing the method of ordering and entropic encoding of a digital signal, and a random access memory 53 containing registers adapted to record variables modified during the running of the program.

This random access memory 53 (RAM) comprises notably registers for storing the status words s[a] . . . s[c] . . . s[i] associated with the different coefficients a, . . . c, . . . , i during the execution of the encoding program.

The microprocessor 51, the read only memory 52 (ROM) and the random access memory 53 can be integrated into the computer 50 as illustrated in FIG. 8.

This computer 50 is connected to different peripherals, for example a digital camera 54 (or a scanner) or any other means of acquiring and storing an image, supplying digital data to be encoded in accordance with the present invention.

The computer 50 also has a communication interface 55 connected to a network 56 able to transmit digital information to be encoded by the computer 50.

The computer 50 also has a storage means 57 such as for example a hard disk. It also has a disk drive 58 adapted to read a diskette 59. The diskette 59 and hard disk 57 can contain digital data to be processed according to the encoding method in accordance with the invention, as well as the execution code of the invention which, once read by the computer 50, will be stored on the hard disk 57.

In a variant, the program for implementing the encoding method according to the invention can be stored in the read only memory 52.

According to another variant, this program can be received in order to stored in a read only memory 52 by means of the communication network 56.

The computer 50 is connected to a microphone 60 by means of an input/output card 61. The processed data will in this case be an audio signal of dimension 1.

The computer 50 also has a screen 62 for displaying the information to be processed or serving as an interface with the user, who can parameterise certain encoding modes, by means of the keyboard 63 or any other means (a mouse for example).

The microprocessor 51 will execute the instructions relating to the implementation of the invention, instructions stored in the read only memory 52 or in the other storage elements.

On powering up, the programs and methods stored in one of the non-volatile memories are transferred into the random access memory 53, which will then contain the executable code of the invention.

Naturally, the diskettes 59 can be replaced by any information carrier such as a CD-ROM or memory card.

The communication bus 64 affords communication between the different elements of the computer 50 or connected to it. The representation of the bus 64 is not limitative and in particular the central unit 51 is capable of communicating the instructions to any sub-element of the computer 50 directly or by means of another sub-element of the computer 50.

Naturally, numerous modifications can be made to the example embodiments described above without departing from the scope of the invention.

The invention claimed is:

1. Method of ordering bits in an N-bit status word (s[c]) adapted to represent a state of a coefficient (c) during an entropic encoding of the coefficient (c) in several passes, the status word (s[c]) including at least one bit indicating whether the coefficient (c) is significant, an encoding bit indicating whether the coefficient (c) was encoded during a first entropic encoding pass, and bits indicating respectively that coefficients (a, b, d, e, f, g, h, i) adjacent to the coefficient (c) are significant when the value of the bits is equal to 1, the method comprising:

choosing a last bit N−1 of the status word (s[c]) to indicate whether the coefficient (c) is significant, the value of the last bit N−1 representing a sign of the status word.

2. Ordering method according to claim 1, in which a penultimate bit N−2 of the status word (s[c]) is chosen as the encoding bit.

3. Ordering method according to one of claim 1 or 2, in which an indication supplied by the value of the encoding bit depends on the value of the last bit N−1 of the status word (s[c]).

4. Ordering method according to one of claim 1 or 2, in which a status word (s[c]) indicates that the coefficient (c) was encoded during the first entropic encoding pass when the value of the encoding bit is equal to the value of the last bit N−1.

5. Ordering method according to one of claim 1 or 2, in which the value of the last bit N−1 equal to 0 indicates that the coefficient (c) is not significant and the value of the last bit N−1 equal to 1 indicates that the coefficient is significant.

6. Method for entropic encoding of a coefficient (c) in several passes, using an N-bit status word (s[c]) adapted to represent a state of the coefficient (c) during the entropic encoding, the status word (s[c]) including at least one bit indicating whether the coefficient is significant, an encoding bit indicating whether the coefficient was encoded during a first entropic encoding pass, and bits indicating respectively that coefficients (a, b, d, e, f, g, h, i) adjacent to the coefficient (c) are significant when the value of the bits is equal to 1, in which the value of the bit N−1 of the status word, representing a sign of the status word (s[c]), indicates whether the coefficient (c) is significant.

7. Encoding method according to claim 6, a coefficient being encoded in a first encoding pass if a first condition is satisfied, the first condition being that the coefficient (c) is not significant and that at least one of the coefficients (a, b, d, e, f, g, h, i) adjacent to the coefficient (c) is significant, comprising the following steps:

comparing the value of the status word (s[c]) associated with the coefficient (c) with the value 0 in order to determine whether the first condition is satisfied or not; and applying the first encoding pass to the coefficient (c) when the first condition is satisfied.

8. Encoding method according to claim 7, further comprising the step of updating the value of a last bit N−1 of a status word (s[c]) indicating whether the coefficient (c) was found significant during the first entropic encoding pass.

9. Encoding method according to one of claim 7 or 8, in which the value of the last bit N−1 equal to 0 indicates that the coefficient (c) is not significant and the value of the last bit N−1 equal to 1 indicates that the coefficient (c) is significant, and, in said comparison step, the first condition is satisfied if the value of the status word (s) is strictly greater than 0.

10. Encoding method according to one of claim 7 or 8, further comprising the step of updating the bit values of the status words (s[a], s[b], s[d], s[e], s[f], s[g], s[h], s[i]) associated with coefficients (a, b, d, e, f, g, h, i) adjacent to the coefficient (c) when the coefficient (c) has been found significant during the first entropic encoding pass.

11. Encoding method according to one of claim 7 or 8, further comprising the step of updating the bit values of the status words (s[a], s[b], s[d], s[e]) associated with coefficients (a, b, d, e) adjacent to the coefficient (c) when the coefficient (c) has been found significant and negative during the first entropic encoding pass.

12. Encoding method according to one of claim 7 or 8, further comprising the step of updating the value of the encoding bit of the status word (s[c]) indicating whether the coefficient (c) was encoded during the first entropic encoding pass.

13. Encoding method according to claim 12, in which the updating of the value of the encoding bit depends on the value of the last bit N−1 of the status word (s[c]).

14. Encoding method according to claim 12, in which, at the step of updating the value of the encoding bit of the status word (s[c]), the value of the encoding bit is equalized with the value of the last bit N−1 when the coefficient (c) was encoded during the first encoding pass.

15. Encoding method according to one of claim 6 or 7, the entropic encoding in several passes being applied successively to different bit planes of a coefficient (c), further comprising the step of:

reinitializing the status word (s) associated with the coefficient (c) after the encoding of a bit plane of the coefficient (c), in which only the value of the encoding bit is reinitialized.

16. Encoding method according to claim 15, in which the indication supplied by the value of the encoding bit depends on the value of the last bit N−1 of the status word (s[c]).

17. Encoding method according to claim 16, in which, in said reinitializing step, the value of the last bit N−1 of the status word (s[c]) is read and an opposite value is entered in the encoding bit of the status word (s[c]).

18. Device for entropic encoding of a coefficient (c) in several passes, using an N-bit status word (s[c]) adapted to represent a state of the coefficient (c) during the entropic encoding, the status word (s[c]) including at least one bit indicating whether the coefficient (c) is significant, an encoding bit indicating whether the coefficient (c) was encoded during a first entropic encoding pass and bits indicating respectively that coefficients (a, b, d, e, f, g, h, i) adjacent to the coefficient (c) are significant when the value of the bits is equal to 1, a coefficient being encoded in a first encoding pass if a first condition is satisfied, the first condition being that the coefficient (c) is not significant and that at least one of the coefficients (a, b, d, e, f, g, h, i) adjacent to the coefficient (c) is significant, in which the value of the bit N−1 of the status word (s[c]) representing the sign of the status word (s[c]) indicates whether the coefficient (c) is significant, said entropic encoding device comprising:

means of comparing the value of the status word (s[c]) associated with the coefficient (c) with the value 0 in order to determine whether the first condition is satisfied or not; and application means adapted to apply a first encoding pass to the coefficient (c) when the first condition is satisfied.

19. Encoding device according to claim 18, further comprising means of updating the value of the last bit N−1 of the status word (s[c]) indicating whether the coefficient (c) was found significant during the first entropic encoding pass.

20. Encoding device according to one of claim 18 or 19, further comprising means of updating the value of the encoding bit of the status word (s[c]) indicating whether the coefficient (c) was encoded during a first entropic encoding pass.

21. Encoding device according to one of claim 18 or 19, further comprising means of updating bit values of the status words (s[a]), s[b], s[d], s[e], s[f], s[g], s[h], s[i]) associated with coefficients (a, b, d, e, f, g, h, i) adjacent to the coefficient (c) when the coefficient (c) was found significant during the first entropic encoding pass.

22. Encoding device according to one of claim 18 or 19, further comprising means of updating the bit values of the status words (s[a], s[b], s[d], s[e]) associated with coefficients (a, b, d, e) adjacent to the coefficient (c) when the coefficient (c) was found significant and negative during the first entropic encoding pass.

23. Encoding device according to one of claim 18 or 19, the entropic encoding in several passes being applied successively to different bit planes of a coefficient (c), further comprising:
means) of reinitializing the status word (s[c]) associated with the coefficient (c) after the encoding of a bit plane of the coefficient (c), in which only the value of the encoding bit is reinitialized.

24. Encoding device according to one of claim 18 or 19, incorporated in a microprocessor, a read only memory being adapted to store a program for entropically encoding coefficients (c), and a random access memory comprising registers adapted to store variables modified during the running of the program.

25. Computer, comprising means adapted to implement the ordering method according to one of claim 1 or 2, including means for choosing a last bit N−1 of the status word (s[c]) to indicate whether the coefficient (c) is significant, and means for choosing a penultimate bit N−2 of the status word (s[c]) as the encoding bit.

26. Computer, comprising means adapted to implement the encoding method according to one of claims 6 to 8, including means for comparing the value of the status word (s[c]) associated with the coefficient (c) with the value 0, and means for applying the first encoding pass to the coefficient (c) when the first condition is satisfied.

27. Digital signal processing device, comprising means adapted to implement the ordering method according to one of claim 1 or 2, including means for choosing a last bit N−1 of the status word (s[c]) to indicate whether the coefficient (c) is significant, and means for choosing a penultimate bit N−2 of the status word (s[c]) as the encoding bit.

28. Digital signal processing device, comprising means adapted to implement the encoding method according to one of claims 6 to 8, including means for comparing the value of the status word (s[c]) associated with the coefficient (c) with the value 0, and means for applying the first encoding pass to the coefficient (c) when the first condition is satisfied.

29. Digital photographic apparatus, comprising means adapted to implement the ordering method according to one of claim 1 or 2, including means for choosing a last bit N−1 of the status word (s[c]) to indicate whether the coefficient (c) is significant, and means for choosing a penultimate bit N−2 of the status word (s[c]) as the encoding bit.

30. Digital photographic apparatus, comprising means adapted to implement the encoding method according to one of claims 6 to 8, including means for comparing the value of the status word (s[c]) associated with the coefficient (c) with the value 0, and means for applying the first encoding pass to the coefficient (c) when the first condition is satisfied.

31. Digital camera, comprising means adapted to implement the ordering method according to one of claim 1 or 2, including means for choosing a last bit N−1 of the status word (s[c]) to indicate whether the coefficient (c) is significant, and means for choosing a penultimate bit N−2 of the status word (s[c]) as the encoding bit.

32. Digital camera, comprising means adapted to implement the encoding method according to one of claims 6 to 8, including means for comparing the value of the status word (s[c]) associated with the coefficient (c) with the value 0, and means for applying the first encoding pass to the coefficient (c) when the first condition is satisfied.

33. Digital printer, comprising means adapted to implement the ordering method according to one of claim 1 or 2, including means for choosing a last bit N−1 of the status word (s[c]) to indicate whether the coefficient (c) is significant, and means for choosing a penultimate bit N−2 of the status word (s[c]) as the encoding bit.

34. Digital printer, comprising means adapted to implement the encoding method according to one of claims 6 to 8, including means for comparing the value of the status word (s[c]) associated with the coefficient (c) with the value 0, and means for applying the first encoding pass to the coefficient (c) when the first condition is satisfied.

35. Photocopier, comprising means adapted to implement the ordering method according to one of claim 1 or 2, including means for choosing a last bit N−1 of the status word (s[c]) to indicate whether the coefficient (c) is significant, and means for choosing a penultimate bit N−2 of the status word (s[c]) as the encoding bit.

36. Photocopier, comprising means adapted to implement the encoding method according to one of claims 6 to 8, including means for comparing the value of the status word (s[c]) associated with the coefficient (c) with the value 0, and means for applying the first encoding pass to the coefficient (c) when the first condition is satisfied.

37. A computer-readable storage medium storing a program comprising software code portions which, when executed, perform the ordering method according to one of claim 1 or 2.

38. A computer-readable storage medium storing a program comprising software code portions which, when executed, perform the encoding method according to any one of claims 6 to 8.

* * * * *

UNITED STATES PATENT AND TRADEMARK OFFICE
CERTIFICATE OF CORRECTION

| | |
|---|---|
| PATENT NO. | : 7,062,095 B2 |
| APPLICATION NO. | : 09/796455 |
| DATED | : June 13, 2006 |
| INVENTOR(S) | : David Bouchard et al. |

Page 1 of 1

It is certified that error appears in the above-identified patent and that said Letters Patent is hereby corrected as shown below:

ON COVER PAGE AT (56) FOREIGN PATENT DOCUMENTS

"EP 2 303 030 A" should read --GB 2 303 030 A--.

COLUMN 7

Line 8, "invention" should read --invention,--.

COLUMN 17

Line 28, "means)" should read --means--.

Signed and Sealed this

Twenty-sixth Day of August, 2008

JON W. DUDAS
*Director of the United States Patent and Trademark Office*